(12) United States Patent
Hixon-Goldsmith et al.

(10) Patent No.: US 7,569,131 B2
(45) Date of Patent: Aug. 4, 2009

(54) METHOD FOR PRODUCING MULTIPLE MAGNETIC LAYERS OF MATERIALS WITH KNOWN THICKNESS AND COMPOSITION USING A ONE-STEP ELECTRODEPOSITION PROCESS

(75) Inventors: April Dawn Hixon-Goldsmith, Campbell, CA (US); Matthew Walter Last, Redwood City, CA (US); Murali Ramasubramanian, San Jose, CA (US); Rolf Beatus Schaefer, Walluf (DE)

(73) Assignee: International Business Machines Corporation, Armonk, NY (US)

( * ) Notice: Subject to any disclaimer, the term of this patent is extended or adjusted under 35 U.S.C. 154(b) by 1069 days.

(21) Appl. No.: 10/218,011

(22) Filed: Aug. 12, 2002

(65) Prior Publication Data

US 2004/0027715 A1 Feb. 12, 2004

(51) Int. Cl.
*C25D 5/10* (2006.01)
*C25D 5/18* (2006.01)
*C25D 21/10* (2006.01)

(52) U.S. Cl. .................. 205/102; 205/91; 205/104; 205/119; 205/148; 205/176

(58) Field of Classification Search ................ 205/102, 205/103, 104, 148, 176, 91, 119
See application file for complete search history.

(56) References Cited

U.S. PATENT DOCUMENTS 3,652,442 A     3/1972  Powers et al. ............... 204/273
3,994,694 A  *  11/1976 Clauss et al. ................. 428/613
4,239,587 A     12/1980 Koel et al. ................ 156/659.1
4,279,707 A      7/1981 Anderson et al. ........... 204/43 T
4,314,893 A  *   2/1982 Clauss ........................ 205/148
4,869,971 A  *   9/1989 Nee et al. .................... 428/635
5,489,488 A  *   2/1996 Asai et al. .................... 428/611
5,582,927 A  * 12/1996 Andricacos et al. ....... 428/694 T
5,606,478 A      2/1997 Chen et al. ................... 360/126

(Continued)

FOREIGN PATENT DOCUMENTS

EP         0442214 A2      8/1991

(Continued)

OTHER PUBLICATIONS

F. A. Lowenheim, Electroplating, McGraw-Hill Book Company, New York, 1978, pp. 376-377.*

(Continued)

*Primary Examiner*—Patrick Ryan
*Assistant Examiner*—William T Leader
(74) *Attorney, Agent, or Firm*—Zilka-Kotab, PC

(57) ABSTRACT

A method for multi-layer electrodeposition in a single bath is also provided. A substrate is immersed in a bath. An electrodeposition operation is initiated for depositing a first layer of material on the substrate. The electrodeposition operation includes agitating the bath and applying current pulses. The electrodeposition operation is later altered for depositing a second layer of material on the first layer, where the second layer is of a different composition than the first layer. In the altered mode, the current density is changed for altering a composition of material deposited on the substrate, the duration and/or frequency of the current pulses are altered, and the bath is agitated at a different rate of agitation.

13 Claims, 7 Drawing Sheets

U.S. PATENT DOCUMENTS

| | | | |
|---|---|---|---|
| 5,864,450 A | 1/1999 | Chen et al. | 360/113 |
| 6,547,946 B2 * | 4/2003 | Meltzer et al. | 205/181 |
| 6,855,240 B2 * | 2/2005 | Cooper et al. | 205/103 |

FOREIGN PATENT DOCUMENTS

| | | |
|---|---|---|
| JP | 6196324 A | 7/1994 |
| JP | 6346276 A | 12/1994 |
| JP | 2000268322 A | 9/2000 |

OTHER PUBLICATIONS

U.S. Appl. No. 09/839,901, filed Apr. 20, 2001, Dinan et al.

P.C. Andricacos et al., "Electrochemical Microfabrication", 1998, IBM Journal of Research and Development, vol. 42, No. 5.

Neil Robertson et al., "High Performance Write Head Using NiFe 45/55", 1997, IEEE Transactions on Magnetics, vol. 33, No. 5.

Romankiw et al., "Magnetic Materials Processes, and Devices", 1992, The Electrochemical Society, Inc.

* cited by examiner

METHOD FOR PRODUCING MULTIPLE MAGNETIC LAYERS OF MATERIALS WITH KNOWN THICKNESS AND COMPOSITION USING A ONE-STEP ELECTRODEPOSITION PROCESS

FIELD OF THE INVENTION

The present invention relates to electrodeposition, and more particularly, this invention relates to creating multiple layers of varying compositions from a single plating bath.

BACKGROUND OF THE INVENTION

Electroplating is a common process for depositing a thin film of metal or alloy on a workpiece article such as various electronic components for example. In electroplating, the article is placed in a suitable electrolyte bath containing ions of a metal to be deposited. The article forms a cathode, which is connected to the negative terminal of a power supply, and a suitable anode is connected to the positive terminal of the power supply. Electrical current flows between the anode and cathode through the electrolyte, and metal is deposited on the article by an electrochemical reaction.

Electroplating is widely used in the thin film head industry to fabricate magnetic and non-magnetic materials that constitute the writing part of a read-write head. Magnetic materials with Nickel and Iron are widely used as the write pole materials in thin film heads. Different compositions of nickel and iron provide different properties and hence are suitable for different applications.

For example, it is desirable to have a material with a large magnetic moment on both sides of the write gap, and materials of lower magnetic moment away from the write gap in order to prevent flux leakage that might cause interference on adjacent tracks of the media.

Thus, a preferred way of building a write head would involve bi-level deposition for both write poles, where material with a high magnetic moment positioned towards the write gap and material with a lower magnetic moment and higher resistivity is positioned away from the gap to reduce adjacent track interferences and eddy current losses, respectively.

It would also be desirable to perform the bi-level deposition from a single plating bath.

U.S. Pat. No. 5,489,488 discloses a process for making a soft magnetic multilayer film by a two step plating process that involves normal plating at the first step, and subsequently dissolving parts of the plated alloy and thereby forming a layer of different composition as the second step. One drawback of this approach is that the second layer is formed by dissolution and not deposition. This is significantly more difficult to control in terms of thickness and composition, because the amount and the relative frequency of dissolution is dictated by the inherent kinetics and not as much by the current. Also disadvantageous, the second layer (layer 7 in the disclosure) has to be significantly thinner than the first layer because of the above mentioned problem of thickness control, which gets worse as the dissolution duration increases.

Japan Patent No. JP6196324A discloses making laminates of different alloy films containing different compositions by changing current densities alone. The inventors use two direct current steps, one after the other in order to get the different compositions forming a sandwich layer. This current profile is then repeated to get repeat layers. However, using this direct current method, the composition range that can be achieved is very limited. The maximum composition range achieved has been 6% Fe ($Ni_{81}Fe_{19}$ to $Ni_{87}Fe_{13}$).

It would therefore be desirable to produce multiple layers of magnetic materials with varying composition from a single plating bath by changing the deposition conditions alone. It would also be desirable to create multilayers by deposition rather than dissolution, which provides significantly better thickness and composition control of the magnetic material. It would also be desirable to produce a bi-layer film with a composition range greater than those heretofore disclosed in the prior art.

DISCLOSURE OF THE INVENTION

A method for multi-layer electrodeposition (also known as electroplating) in a single bath is provided. First, a substrate is immersed in a bath containing, for example, nickel (Ni) and iron (Fe) salts. Note that the term "substrate" as used herein may be a clean base upon which material is deposited, or can be a previously/partially formed wafer. A current of a first density is applied to the substrate for electrodepositing a first layer of material on the substrate. The current is toggled between first high and low values at first intervals. In other words, pulses of current are applied by toggling the current on (high) and off (low), or, if voltage biasing is being applied, between higher and lower levels. The bath is agitated near the substrate at a first rate of agitation. Note that the rate of agitation can be quantified as a cycle speed of the agitating device, such as the time it takes for a paddle to return to a start position. After a predetermined amount of time has elapsed and/or the first layer is of the desired thickness, a current of a second density is applied to the substrate for electrodepositing a second layer of material on the substrate. The second layer is of a different composition than the first layer. The current of the second density is toggled between second high and low values at second intervals. The bath is again agitated near the substrate at a second rate of agitation.

The first layer can be formed to have a higher magnetic moment than the second layer, or the second layer can have a higher magnetic moment than the first layer. Preferably, one of the layers is composed of greater than 70% iron to provide a very high magnetic moment, with the other of the layers composed of between 45 and 55% iron, and ideally about 50% iron, to provide the highest resistivity and about 15% lower magnetic moment.

According to one embodiment, the composition of the first layer is determined by the settings of the following variables: current density, the high current value, the duration of the pulse (i.e., duration that the voltage is at the high value during toggling), and the rate of agitation. Once the first layer is deposited, one or more of these variables can be changed to deposit materials of a second composition. So, for example, any of the values for these variables can be different than their respective settings during deposition of the first layer. For example, in one combination the first and second current densities are different, the first and second high current values are different, and the first and second rates of agitation are the same. In another combination, the first and second current densities are different, the first and second high current values are the same, and the first and second rates of agitation are different. In a further combination, the first and second current densities are the same, the first and second high current values are different, and the first and second rates of agitation are different.

As an option, the amount of time that the current is at the first high value is different than the amount of time the current is at the first low value. Similarly, the amount of time that the current is at the second high value can be different than the amount of time the current is at the second low value. Preferably, the amounts of time that the current is at the first and second high values and at the first and second low values are each independently determinable.

In one embodiment, the bath is agitated by a paddle. The rate of agitation is varied by varying a speed of the paddle relative to the substrate. A portion of the first and second layers can be used to form at least a portion of a write pole of a magnetic write head.

After a predetermined amount of time has elapsed and/or the second layer is of the desired thickness, a current of a third density can be applied to the substrate for electrodepositing a third layer of material on the substrate, where the third layer is of a different composition than the second layer. The current is toggled between third high and low values at third intervals, and the bath is agitated near the substrate at a third rate of agitation. This process can be repeated as many times as desired to add additional layers.

Another method for multi-layer electrodeposition in a single bath is also provided. A substrate is immersed in a bath. An electrodeposition operation is initiated for depositing a first layer of material on the substrate. The electrodeposition operation includes agitating the bath and applying current pulses. The electrodeposition operation is later altered for depositing a second layer of material on the first layer, where the second layer is of a different composition than the first layer. In the altered mode, the current density is changed for altering a composition of material deposited on the substrate to form the second layer, the duration and/or frequency of the current pulses are altered, and the bath is agitated at a different rate of agitation.

A write head having multi-layer pole tips is also provided. The write head includes a first pole tip and a second pole tip opposing the first pole tip. A write gap is defined between the first and second pole tips. A conductive coil is built in between the first and the second pole tip. Preferably, the first and second pole tips each have two layers of differing composition, in which the layers positioned towards the write gap have a higher magnetic moment than the layers positioned away from the write gap. The layers of part of the first pole tip (P1P) has been formed in a single electrodeposition process. The layers of part of the second pole tip (P2P) have also been formed in a single electrodeposition process.

BRIEF DESCRIPTION OF THE DRAWINGS

For a better understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
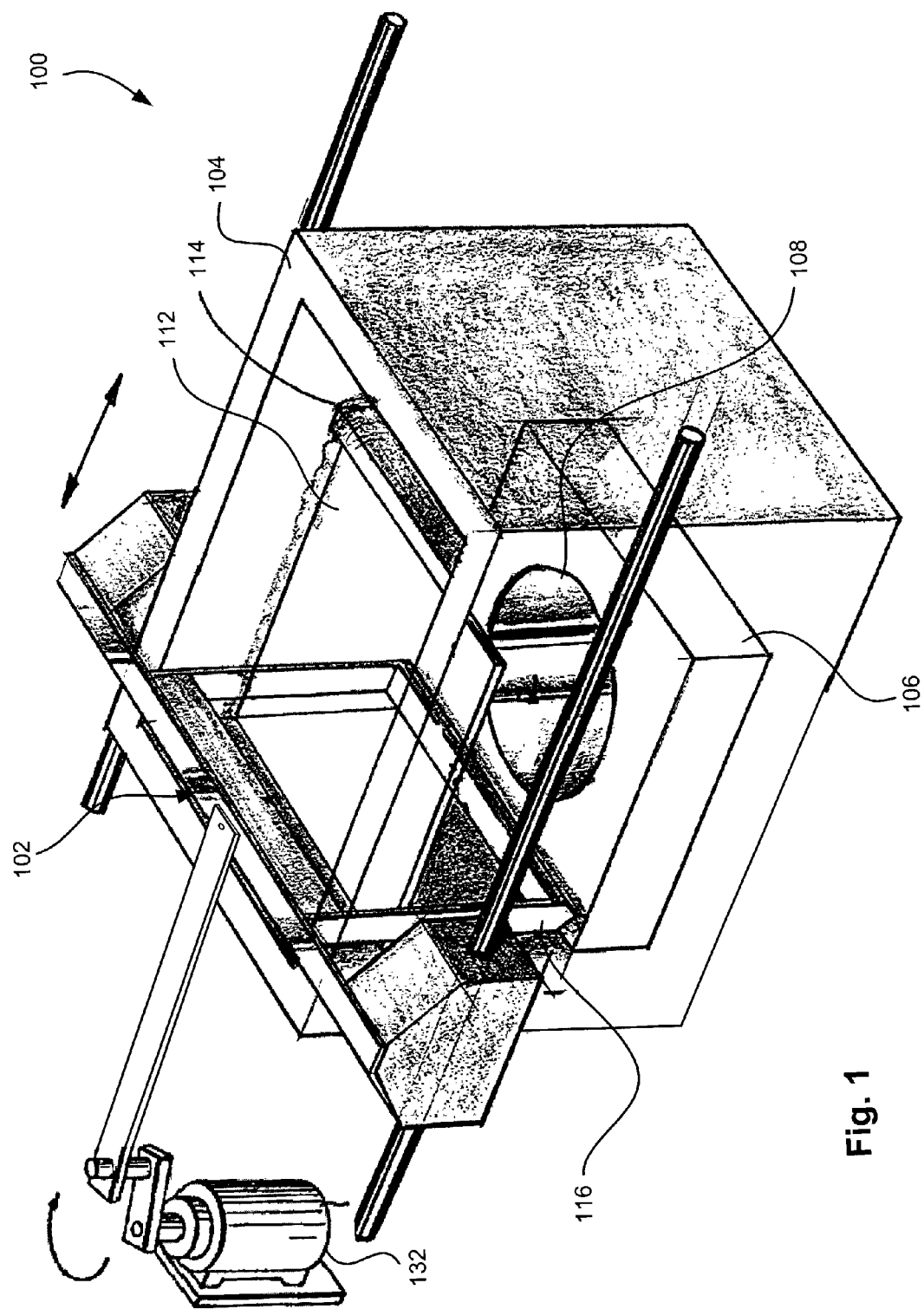
FIG. 1 is a perspective view of a plating cell according to one embodiment.

FIG. 1 depicts a plating cell 100 having a paddle assembly 102. The plating of nickel-iron alloys is performed in a container 104. The walls of the container 104 can be composed of a dielectric material such as glass or a plastic such as polymethacrylate. Positioned in the container 104 is a cathode 106. The cathode 106 may be composed of a metal plate having plater's tape composed of an insoluble polymer adhesively secured to the exterior thereof on the edges and lower surface to protect it from the electroplating bath and thus giving a very ill defined current density and current density distribution. A substrate 108 to be plated is positioned in a depression 110 (FIG. 2) in the cathode 106. Note that the term "substrate" as used herein may be a clean base upon which material is deposited, or can be a previously/partially formed wafer. Substrate materials may include, for example, 1¼ inch diameter sapphire, garnet, various ceramics or Si wafers covered with thermal $SiO_2$ and metallized with 50A to 200A of Ti and 100A to 1000A of Cu, Permalloy alloy, Au, etc.

An anode 112 is also positioned in the container 104 and may be composed of wire mesh screening. The anode 112 may also be composed of inert platinum, solid nickel or of a combination of an inert Pt sheet and a Ni wire mesh.

The bath level during plating is above the anode 112, so the anode 112 is immersed in the bath during plating. The bath level is held relatively constant by a solution overflow 114 over which the solution flows. The bath is constantly replenished and its temperature is controlled by recirculation from a reservoir (not shown) where it is refreshed by dispensing acid, iron and preferably also Na Saccharin, Na lauryl sulfate and/or [$Ni^{++}$] if needed and constantly stirred by a reciprocating mixer 116 otherwise referred to herein as a paddle 116, which travels back and forth above the surface of cathode 106 at an approximate distance of ⅟₃₂ to ⅛ inch for providing agitation of the bath, preferably with minimal turbulence.

Figure 2:
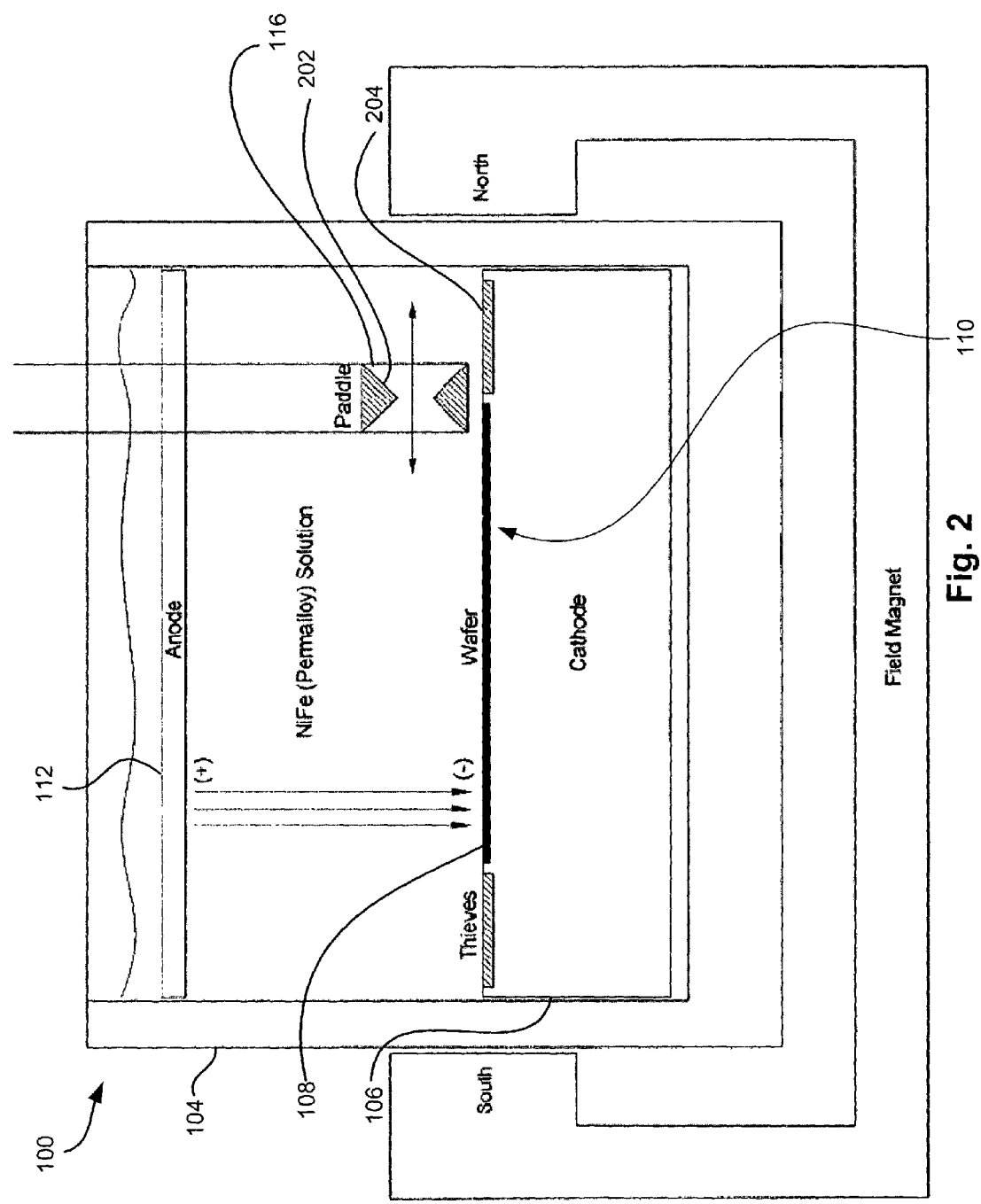
FIG. 2 is a cross sectional view of a plating cell according to one embodiment.

As shown in FIG. 2, the paddle 116 is in the exemplary form of a pair of vertically elongate, triangular (45°-90°-45°) blades 202 having spaced apart, parallel apexes defining therebetween a slot through which the fluid is flowable. The blades 202 of the paddle 116 have oppositely facing, parallel, flat bases with one of the bases being disposed parallel to and closely adjacent to the substrate 108.

Preferably, the paddle travels at a constant velocity over the object being plated to provide the most uniform film deposition. Thus, a programmable motor can be used, such as a rotary motor with a worm screw, or a linear conversion actuator. These mechanisms provide a generally trapezoidal velocity profile. Consequently, layers of films produced in the electroplating cell of this embodiment are uniformly thick throughout, and where metal alloys are being plated, the metal compositions of particular layers will also be uniform over the entire film.

Referring again to FIG. 1, when the motor 132 is energized, the paddle 116 is driven back and forth over the length of the substrate 108, with acceleration and deceleration preferably occurring over thieves 204, also known as deflectors, on the cathode 106.

The speed of the cycle (one pass of the paddle 116 forward and back) can be changed by varying the rotation speed of the motor 132.

Using equipment such as that described above for electrodeposition (electroplating), multiple layers of magnetic materials with varying composition can be deposited from a single plating bath by changing the deposition conditions alone. By controlling the plating conditions, the composition of the materials deposited on the substrate can be manipulated to produce alloys of different composition, and hence different magnetic moments, using a one-step electrodeposition process.

For example, in the case of a thin-film write head, it is desirable to have a material with as large a magnetic moment as possible on both sides of the write gap. However, it is preferable to have materials with a lower magnetic moment positioned away form the write gap in order to prevent flux leakage that might cause interference on the adjacent tracks of the media being written to.

Accordingly, the methodology presented herein allows creation of a bi-layer structure in which a first layer has a higher magnetic moment than a second layer, or in which the second layer has a higher magnetic moment than the first layer. In this way, bi-layer write poles can be built with a lower magnetic moment material positioned away from the write gap.

Prior to actual plating, the plating conditions that produce the desired alloy composition are determined experimentally (see below) for the particular type of plating equipment being used. These conditions can then be programmed into the controller.

Figure 3:
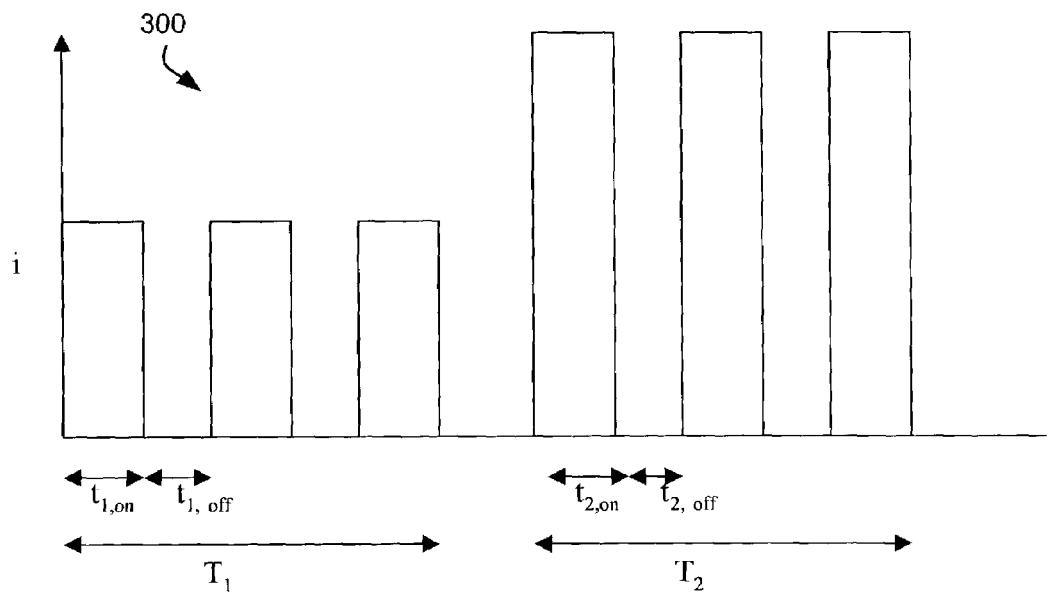
FIG. 3 illustrates a pulse plating waveform.

FIG. 3 illustrates the basic current waveform 300, which is a pulse plating waveform. $T_1$ and $T_2$ are the total plating times for a single alloy composition (low Fe, high Fe); $t_{1,on}$ and $t_{1,off}$ are the pulse on and off times for the first alloy composition; and likewise for $t_2$. Pulsing the current provides four additional variables (the on and off times for each) in order to control the alloy composition in addition to the current density alone, which helps in increasing the range of compositions that can be plated out of a single bath as shown in FIG. 4.

Figure 4:
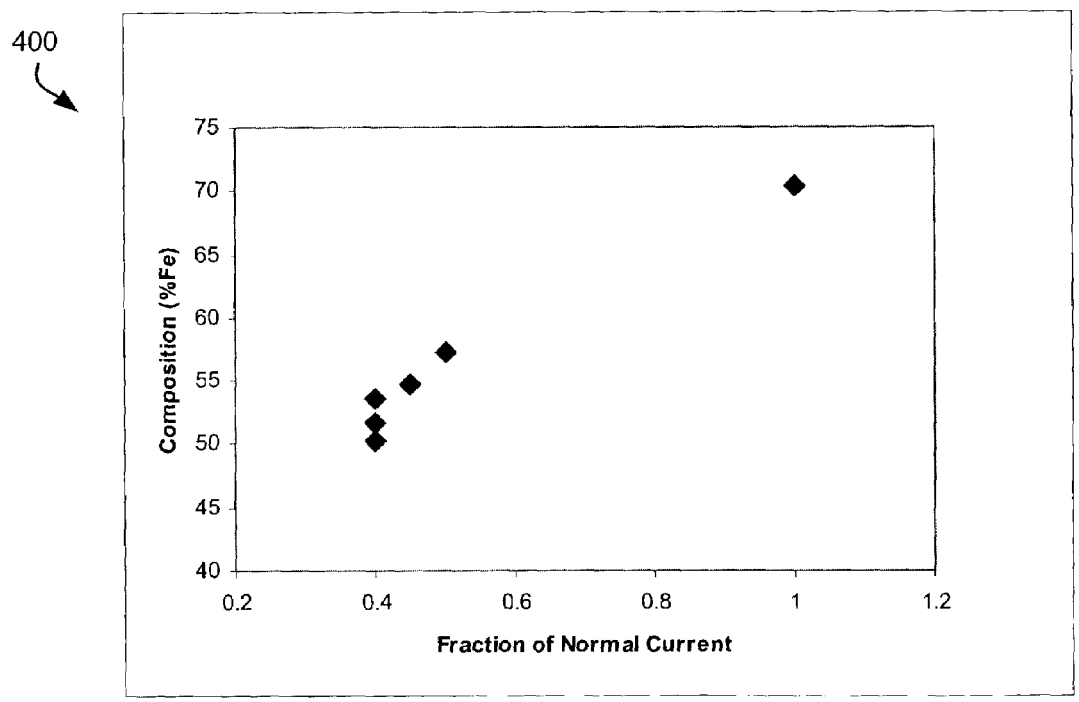
FIG. 4 is a graph that illustrates the effect of average current density on composition.

FIG. 4 is a graph 400 that illustrates the effect of average current density on composition. As shown, by applying a fraction of the normal plating current (as determined by the frequency and/or intensity of the pulses), the composition of Fe deposited can be reduced.

In addition to the above variables, the mass transport rate can be used as a way of changing the composition in the plating bath. As mentioned above, the NiFe plating tool uses a paddle to serve as the primary mass transport mechanism for the ions to get to the plating surface. Changing the rate of agitation changes the boundary layer thickness on the plated device and thereby changes the relative ionic concentrations at the surface (different diffusion coefficients for Fe and Ni ions, respectively). This also results in a very handy way of in-situ composition variation.

Figure 5:
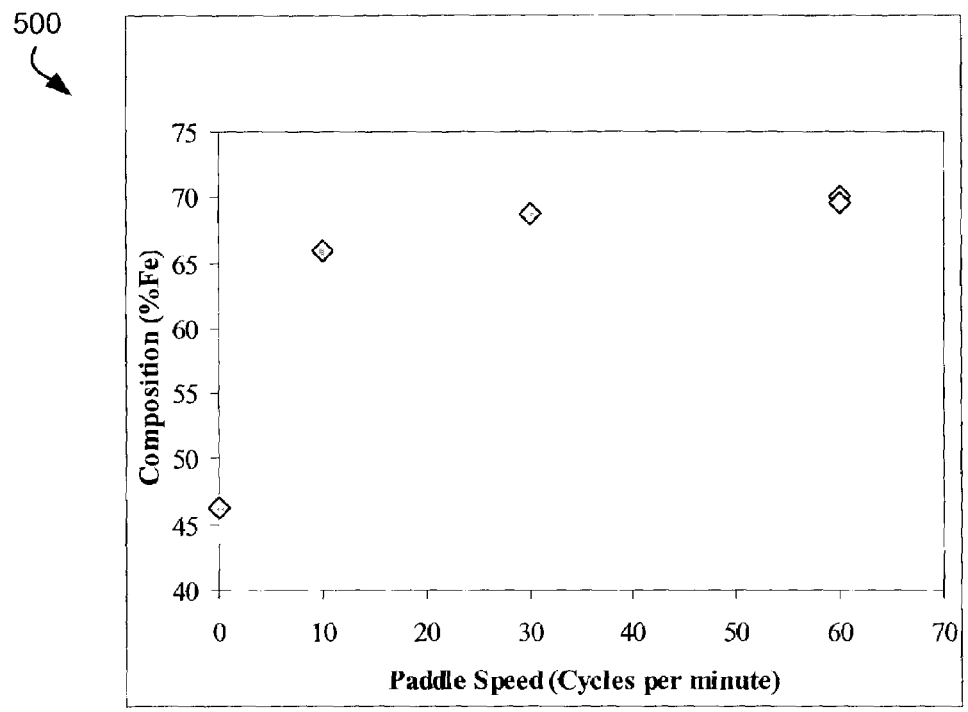
FIG. 5 is a chart showing the effects of paddle speed on the plated composition.

FIG. 5 is a chart 500 showing the effects of paddle speed on the plated composition. As shown, the slower the paddle speed, the less Fe is plated, with the sharpest decline occurring between 0 and 10 cycles per minute (which will vary with the particular plating tool being used).

Figure 6:
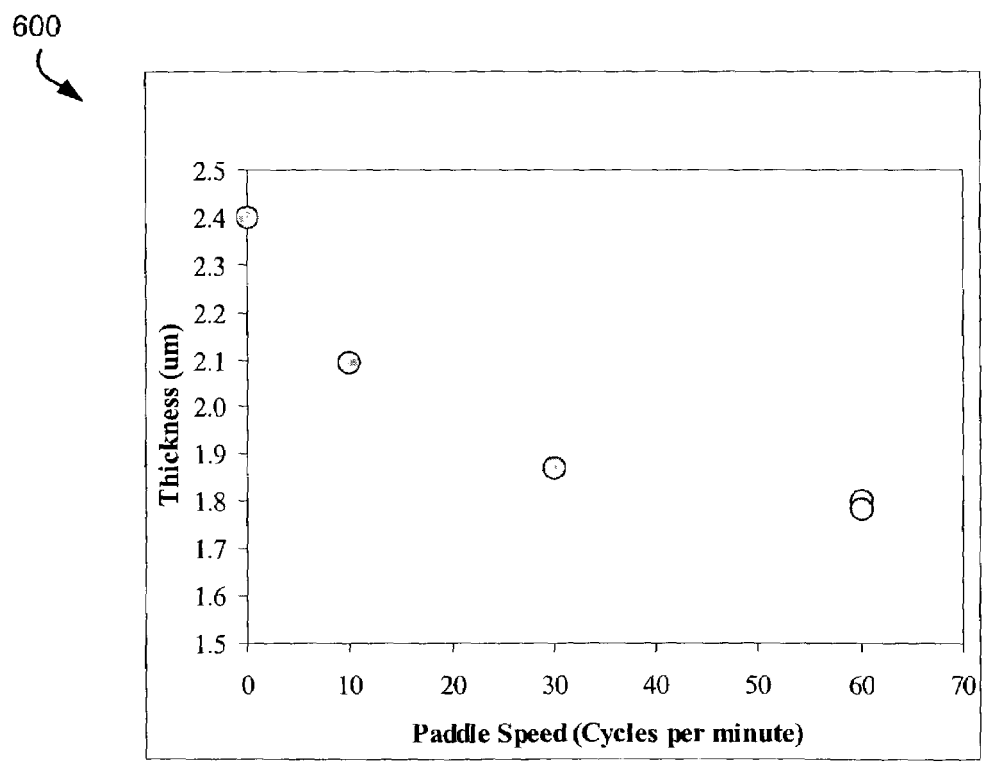
FIG. 6 is a chart showing the effects of paddle speed on plated thickness.

FIG. 6 is a chart 600 showing the effects of paddle speed on plated thickness. By increasing the paddle speed, the thickness of the plating is reduced for a given time period. The reason is because typically about half of the current goes to hydrogen evolution. As the paddle slows, the hydrogen is not replenished as quickly and so the current is applied to the other materials, causing them to plate faster.

A combination of all the above processes provides good control of thickness and composition for a wide range of plated film compositions. By changing combinations of the paddle speed, average current density, and pulse duration using the particular plating tool to be used during the plating, the operator can select the proper parameters to obtain a multi-level plating of the desired compositions. Once the first layer is deposited, one or more of these variables can be changed to deposit materials of a second composition. So, for example, during deposition of the second layer, any of the values for these variables can be different than their respective settings during deposition of the first layer. Table 1 lists several possible combinations of the variables, where "same" represents the same setting during deposition of the first and second layers; and where "different" represents different setting during deposition of the first and second layers.

TABLE 1

| Current Density | Pulse Duration | Paddle Speed |
|---|---|---|
| same | same | different |
| same | different | different |
| same | different | same |
| different | same | same |
| different | same | different |
| different | different | same |
| different | different | different |

Figure 7:
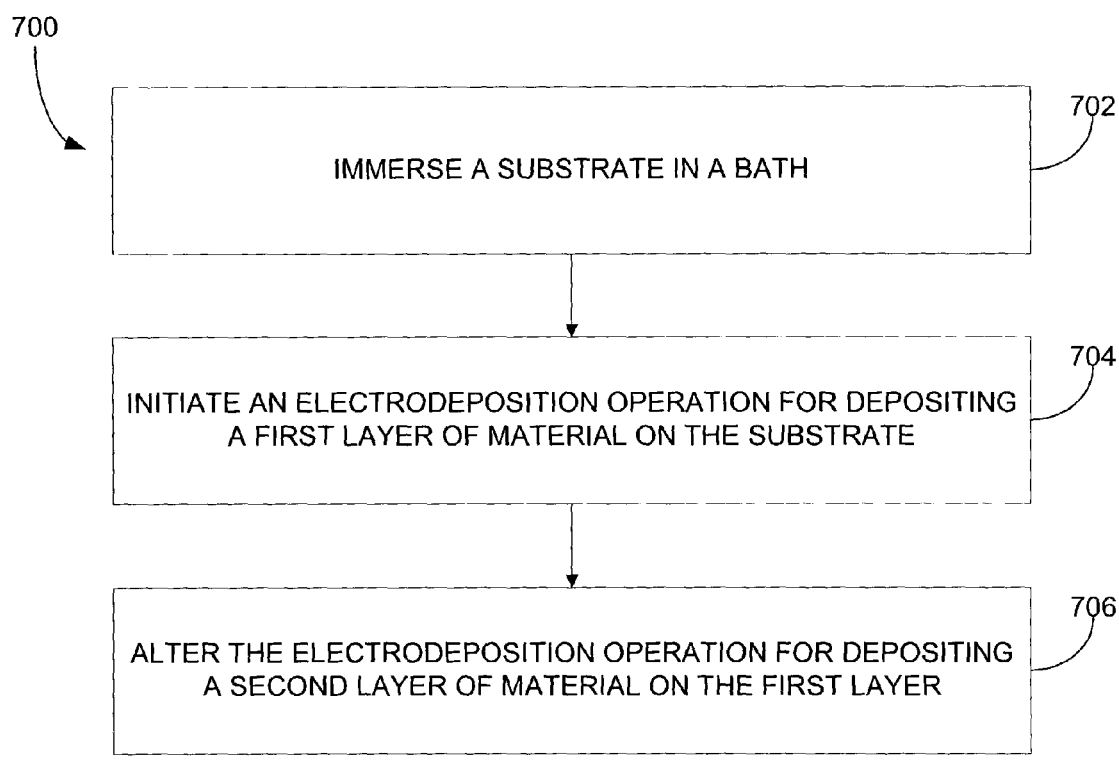
FIG. 7 is a flow diagram of a simple process for multi-layer electrodeposition in a single bath.

FIG. 7 is a flow diagram of a simple process 700 for multi-layer electrodeposition (also known as electroplating) in a single bath. In operation 702, a substrate is immersed in a bath. In operation 704, an electrodeposition operation is initiated for depositing a first layer of material on the substrate. The electrodeposition operation includes agitating the bath and applying current pulses. The electrodeposition operation is later altered in operation 706 for depositing a second layer of the material on the first layer, where the second layer is of a different composition than the first layer. In the altered mode, the current density is changed, the duration and/or frequency of the current pulses are altered, and the bath is agitated at a different rate of agitation for altering a composition of material deposited on the substrate to form the second layer. Note that the wafer does not need to be removed from the bath between cycles.

Figure 8:
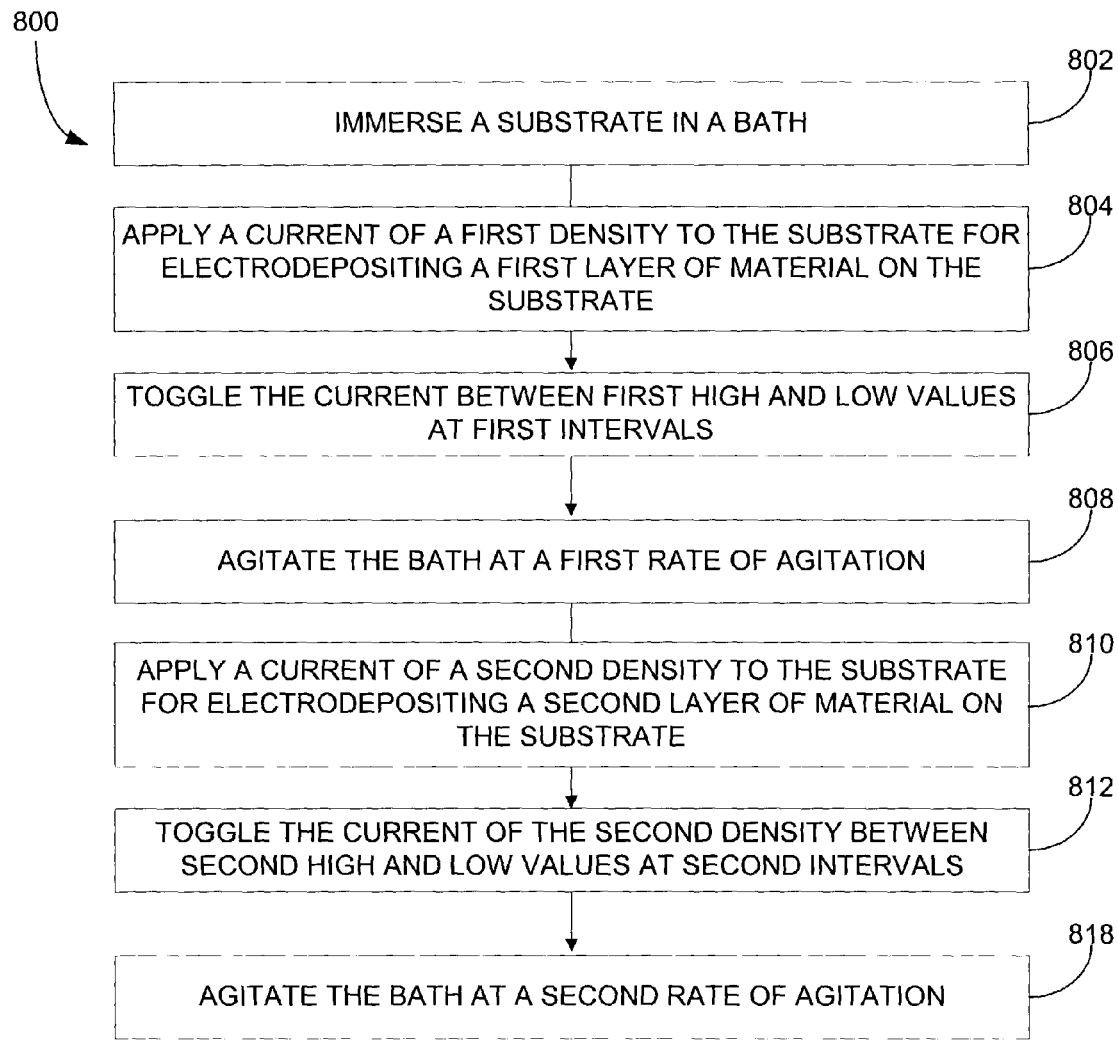
FIG. 8 is a flow diagram of a process for multi-layer electrodeposition (also known as electroplating) in a single bath.

FIG. 8 is a flow diagram of a process 800 for multi-layer electrodeposition in a single bath. In operation 802, a substrate is immersed in a bath containing, for example, Ni and iron Fe. In operation 804, a current of a first density is applied to the substrate for electrodepositing a first layer of material on the substrate. In operation 806, the current is toggled between first high and low values at first intervals to create current pulses. In other words, pulses of current are applied by toggling the current on (high) and off (low), or, if voltage biasing is being applied, between higher and lower levels. The pulsing allows the concentration gradients in the bath to equalize.

The bath is agitated at a first rate of agitation in operation 808. Note that the rate of agitation can be quantified as a cycle speed of the agitating device, which can be a paddle as mentioned above.

After a predetermined amount of time has elapsed and/or the first layer is of the desired thickness, the plating conditions are altered to form a second layer of a different composition than the first layer. In operation 810, a current of a second density is applied to the substrate for electrodepositing a second layer of material on the substrate. Note operation 810. The first and second current densities may be the same or different.

In operation 812, the current of the second density is toggled, or pulsed, between second high and low values at second intervals. Preferably, the lengths of the pulses, and the intervals therebetween, are independently determinable.

The bath is agitated at a second rate of agitation in operation 818. The first and second rates of agitation can be the same or different.

Preferably, one of the layers is composed of greater than 70% iron to provide a very high magnetic moment, with the other of the layers composed of between 45 and 55% iron, and ideally about 50% iron, to provide the highest resistivity and thereby a lower magnetic moment. For example, the plating conditions can be changed to plate the second layer with a NiFe composition of about 50% Ni and 50% Fe from a plating bath that is nominally being used for plating a NiFe composition of 30% Ni and 70% Fe.

This process can be repeated as many times as desired to add additional layers. For example, after a predetermined amount of time has elapsed and/or the second layer is of the desired thickness, a current of a third density can be applied to the substrate for electrodepositing a third layer of material on the substrate, where the third layer is of a different composition than the second layer. The current is toggled between third high and low values at third intervals, and the bath is agitated near the substrate at a third rate of agitation.

Figure 9:
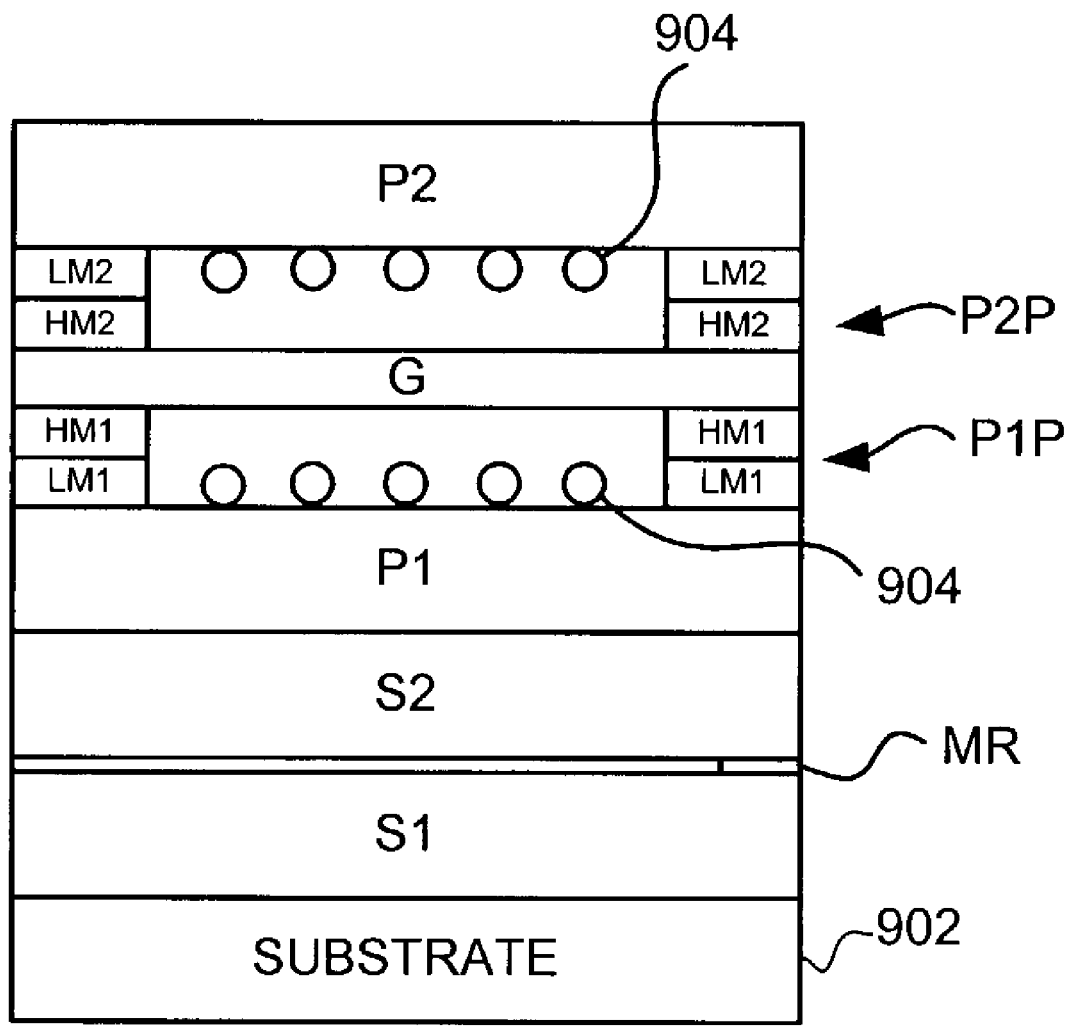
FIG. 9 depicts a write head having multi-layer pole tips.

FIG. 9 depicts a write head 900 having multi-layer pole tips P1P, P2P. As shown, a first shield layer S1 is positioned on a substrate 902. A second shield layer S2 sandwiches an MR sensor MR between the first and second shield layers S1, S2. Pole layer P1 is coupled to the second shield layer S2. Bi-level portions P1P, P2P of the pole layers P1, P2 face each other. A write gap G is defined between the pole layers P1, P2. A conductive coil 904 is coupled to at least one of the pole layers.

The pole tips P1P, P2P each have two layers HM1, LM1, HM2, LM2 of differing composition, in which the layers HM1, HM2 positioned towards the write gap G have a higher magnetic moment than the layers LM1, LM2 positioned away from the write gap G. The layers HM1, LM1 of the first pole layer P1 have been formed in a single electrodeposition process. The layers HM2, LM2 of the second pole layer P2 have been formed in a second single electrodeposition process.

As should be apparent to one skilled in the art, the embodiments described above produce write heads that are more reliable than those created by prior art processes. Electrodeposition by the above processes require less steps to produce more effective multi-layered write heads and do not require changing the bath. Using a steady state controlled bath offers a significant advantage in terms of processing simplicity and tool capacity requirements. Further, these embodiments provide superb thickness and composition control when performing multi-layered deposition of magnetic material.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method including multi-layer electrodeposition of a pole tip in a single bath, comprising:
   in a first single bath electrodeposition process:
   immersing a substrate in a bath, the substrate having thereon first and second shield layers sandwiching a magnetoresistive sensor, and a first pole layer above the second shield layer;
   applying a first current of a first current density to the substrate for electrodepositing a first layer of a first pole tip on the first pole layer;
   toggling the first current between first high and low values at least twice at first intervals;
   agitating the bath near the substrate at a first rate of agitation;
   applying a second current of a second current density to the substrate for electrodepositing a second layer of the first pole tip on the substrate above the first layer of the first pole tip, the second layer being of a different composition than the first layer, wherein the second layer of the first pole tip has a higher magnetic moment than the first layer of the first pole tip;
   toggling the second current between second high and low values at least twice at second intervals;
   agitating the bath near the substrate at a second rate of agitation different than the first rate of agitation;
   forming a write gap layer above the second layer of the pole tip;
   in a second single bath electrodeposition process:
   applying a third current of a third current density to the substrate for electrodepositing a second layer of a second pole tip above the write gap layer;
   toggling the third current between third high and low values at least twice at third intervals;
   agitating the bath near the substrate at a third rate of agitation;
   applying a fourth current of a fourth current density to the substrate for electrodepositing a first layer of the second pole tip above the second layer of the second pole tip, the second layer of the second pole tip being of a different composition than the first layer of the second pole tip, wherein the second layer of the second pole tip has a higher magnetic moment than the first layer of the second pole tip;
   toggling the fourth current between fourth high and low values at least twice at fourth intervals; and
   agitating the bath near the substrate at a fourth rate of agitation; and
   forming a second pole layer above the second pole tip,
   wherein the first and second layers of the first and second pole tips include nickel and iron,
   wherein the first and second layers of the first pole tip are not coextensive with the first pole layer, and
   wherein the first and second layers of the second pole tip are not coextensive with the second pole layer.

2. The method as recited in claim 1, wherein at least one of the second current density, the second high current value, and a duration that the voltage is at the second high values during toggling is different than the first current density, the first high current value, and a duration that the voltage is at the first high values during toggling, respectively.

3. The method as recited in claim 2, wherein the first and second current densities are different.

4. The method as recited in claim 2, wherein the first and second high current values are different.

5. The method as recited in claim 2, wherin the high current values of the second and third currents are the same, wherein the second and third rates of agitation are the same, wherein the second and third current densities are the same.

6. The method as recited in claim 1, wherein the first layers of the pole tips have about a same composition, wherein the second layers of the pole tips have about a same composition.

7. The method as recited in claim 1, wherein an amount of time that the first current is toggled at the first high value is different than an amount of time the first current is toggled at the first low value.

8. The method as recited in claim 1, wherein an amount of time that the second current is toggled at the second high value is different than an amount of time the second current is toggled at the second low value.

9. The method as recited in claim 1, wherein amounts of time that the first and second currents are toggled at the first and second high values and toggled at the first and second low values are each independently determinable.

10. The method as recited in claim 1, wherein the bath is agitated by a paddle, wherein the rate of agitation is varied by varying a speed of the paddle relative to the substrate.

11. The method as recited in claim 1, wherein a portion of the first and second layers is used to form at least a portion of a write pole of a magnetic write head.

12. A method for multi-layer electrodeposition in a single bath, comprising:

immersing a substrate in a bath, the substrate having thereon a shield layer above a magnetoresistive sensor and a first pole layer above the shield layer;

initiating an electrodeposition operation for depositing a first layer of material on the first pole layer for forming a first portion of a first pole tip, the electrodeposition operation including agitating the bath and applying current pulses; and altering the electrodeposition operation for depositing a second layer of material on the first layer for forming a second portion of the first pole tip, wherein the second layer is of a different composition than the first layer, wherein the second layer has a higher magnetic moment than the first layer, the altered electrodeposition operation including:

changing a current density for altering a composition of material deposited on the substrate;

altering at least one of a duration and a frequency of the current pulses; and agitating the bath at a different rate of agitation;

forming a write gap layer;

initiating a second electrodeposition operation for depositing a third layer of material on the substrate above the write gap layer forming a first portion of a second pole tip, the electrodeposition operation including agitating the bath and applying current pulses; and altering the second electrodeposition operation for depositing a fourth layer of material on the third layer for forming a second portion of the second pole tip, wherein the fourth layer is of a different composition than the third layer, wherein the third layer has a higher magnetic moment than the fourth layer, the altered second electrodeposition operation including:

changing a current density for altering a composition of material deposited on the substrate;

altering at least one of a duration and a frequency of the current pulses; and agitating the bath at a different rate of agitation; and forming a second pole layer above the second pole tip, wherein the first and second layers forming the first and second portions of the first pole tip and the third and fourth layers forming the first and second portions of the second pole tip include nickel and iron, wherein the first and second layers forming the first and second portions of the first pole tip are not coextensive with the first pole layer, and wherein the third and fourth layers forming the first and second portions of the second pole tip are not coextensive with the second pole layer.

13. The method as recited in claim 12, wherein the first and fourth layers have about the same composition, wherein the second and third layers have about the same composition.

* * * * *